United States Patent

[11] 3,631,912

[72] Inventor Werner Helmut Rieger
 Haus Haselbach,
 Unterkochen, Wurttemberg, Germany
[21] Appl. No. 884,546
[22] Filed Dec. 12, 1969
[45] Patented Jan. 4, 1972
[32] Priority Dec. 17, 1968
[33] Germany
[31] P 18 16 532.7

[54] TIRE PROTECTION AND ANTISKID CHAIN
 15 Claims, 6 Drawing Figs.
[52] U.S. Cl. ................................................. 152/239
[51] Int. Cl. ................................................. B60c 27/00
[50] Field of Search .......................................... 152/239, 243

[56] References Cited
 UNITED STATES PATENTS
 1,921,192 8/1933 Keaney ........................ 152/243
 3,382,906 5/1968 Muller et al. ................ 152/243
 FOREIGN PATENTS
 947,356 8/1956 Germany ...................... 152/243

*Primary Examiner*—James B. Marbert
*Attorney*—Smythe & Moore

ABSTRACT: A tire protection and antiskid chain with chain strand members arranged in rows and formed of oval round steel links, the successive links of which strand members having one and the same orientation are connected in each case alternately by connecting elements with links of the same orientation of the one chain strand piece and the other adjacent chain strand piece.

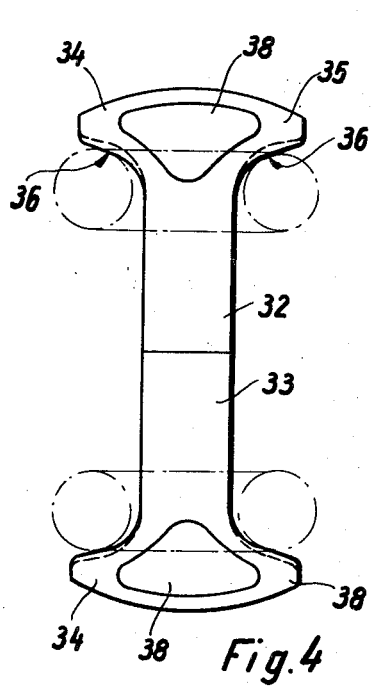
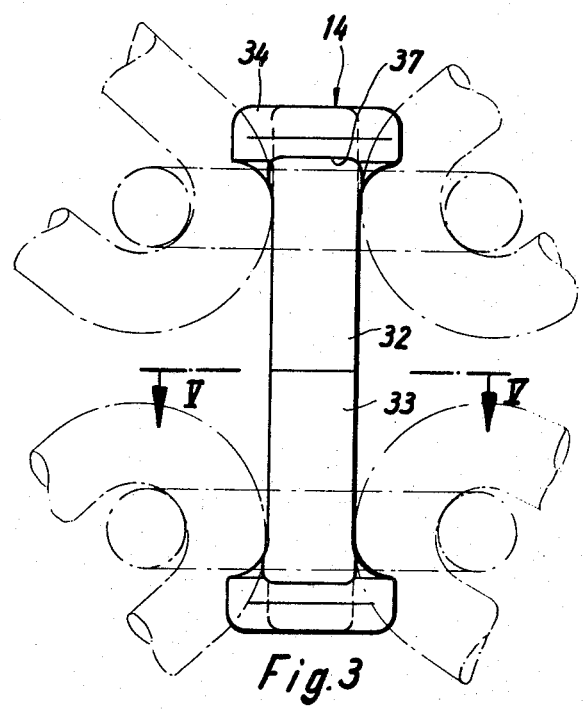
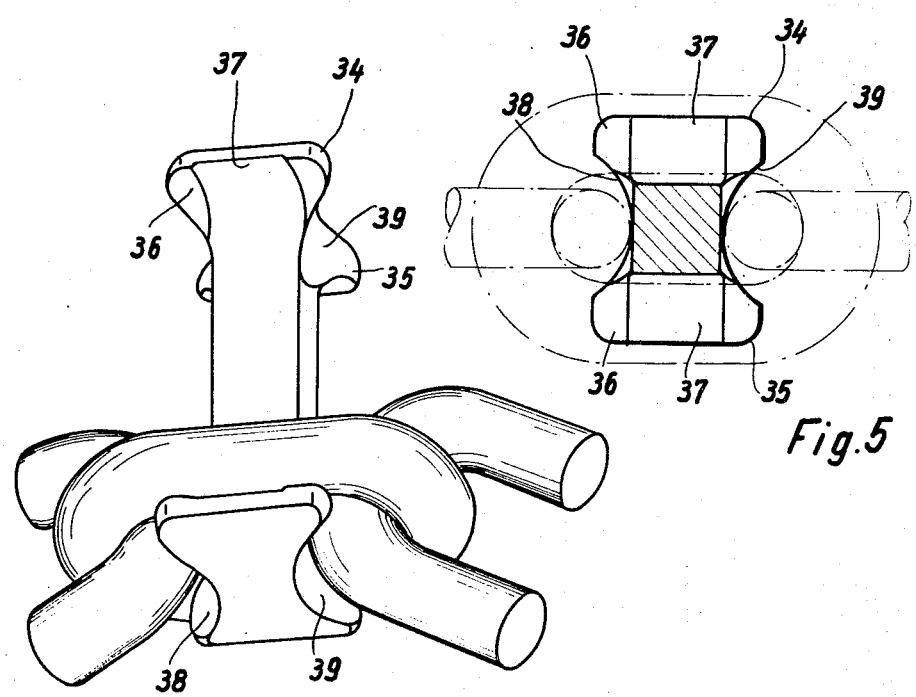

TIRE PROTECTION AND ANTISKID CHAIN

This invention relates to tire chains. Tire protection and antiskid chains of the aforementioned type are known in which the connecting elements are formed by vertical links which in each case connect two adjacent horizontal links of adjacent chain strands with the formation of a honeycomb-shaped structure. In these chains, in each case, one arm of the horizontal links coupled with the connecting elements is stressed comparatively strongly in flexure.

One of the objects of this invention is to remedy the foregoing and further to develop a tire chain of the aforementioned type in such a manner that the flexural stressing of the links which are connected with the connecting elements is less than in the previously known chains.

The object of the invention can be obtained by use of connecting elements which have essentially the shape of double-T anchors with projections present at the ends connecting in each case two vertical links to each other.

The chain of the invention affords the advantage that the connecting elements rest in each case against two arms of the links coupled with them. In this way the specific flexural load is reduced to about one-half. In addition to this, the horizontal links remain free and in accordance with another proposal can bear movable bars. A tire chain with such additional bars which are placed on the horizontal links affords the advantage that it not only has an increased wear surface, but also a substantially increased density of netting without having to do away with the honeycomb shape which is desirable for reasons of good self-cleaning. Furthermore, the bars indirectly reduce the specific bearing pressure between the vertical links and the tire.

Additionally, there is the possibility of so selecting the dimensions of the chain links that the diameter of the movable bars surround the horizontal links is greater than the diameter of the links of the chain strand pieces. In this way it is possible to relieve the links of the chain strand pieces from wear.

In one advantageous embodiment of the invention, the chain strand pieces are arranged transverse to the direction of travel. Such an arrangement has the advantage that the last vertical links of the chain strand members can be used as connecting links for the side parts of the tire chain. Another embodiment, which is also advantageous, is one in which the chain strand members are arranged in the direction of travel of the wheel to afford the advantage that very long chain strand members can be used in the manufacture of the chain.

The connecting elements are preferably each formed of a crossbar, the profile of which corresponds to the free inside space of the vertical links in the chain, and which has at the ends luglike projections with supporting surfaces adapted to the shape of the arms of the vertical links.

In order to assure a good bearing between the projections of the connecting elements and the arms of the vertical links, the supporting surfaces are provided with a recess in the region of the welds of the vertical links.

In order to obtain the largest possible supporting surfaces, the luglike projections are broadened towards their free ends.

The invention will be explained in further detail below on basis of two illustrative embodiments shown in the accompanying drawings.

In the drawings:

FIG. 3 is a top view of a connecting element of the tire chains in accordance with FIGS. 1 and 2;

FIG. 4 is a side elevation of the connecting element according to FIG. 3;

FIG. 5 is a section along the line V—V of FIG. 3, and

FIG. 6 is a perspective view of the connecting element of FIGS. 3 to 5.

Figure 1:
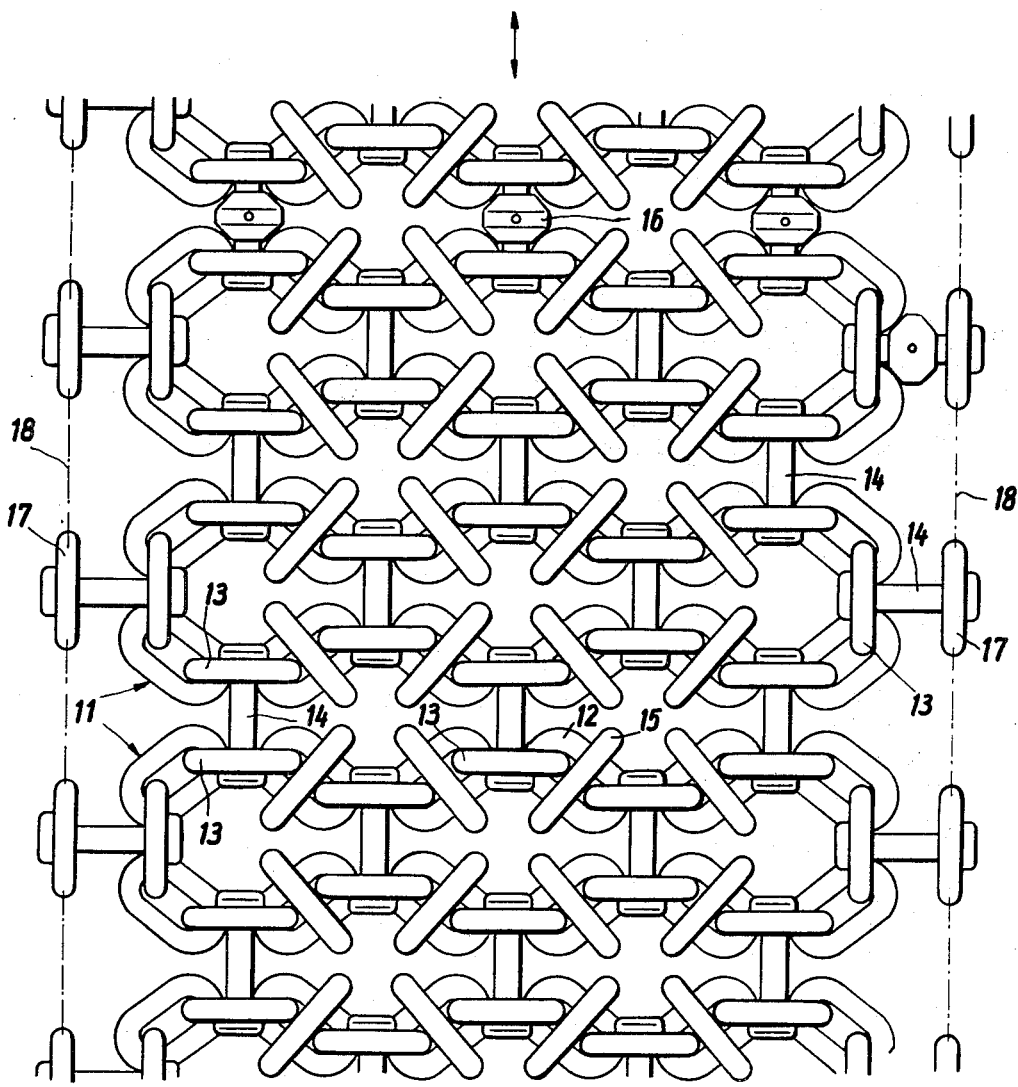
FIG. 1 is a top view of a part of a spreadout tire protection and antiskid chain in accordance with the invention with chain strand pieces arranged transverse to the direction of travel.

In FIG. 1, the chain strand pieces of a tire protection and antiskid chain in accordance with the invention which extend transverse to the direction of travel are indicated generally as 11. These chain strand pieces consist in each case of horizontal links 12 lying parallel to the tread of the tire and vertical links 13 arranged perpendicular to the tire tread. Due to the fact that the horizontal links are arranged obliquely to the direction of travel and the individual chain strand pieces extends substantially in zigzag shape, one obtains a honeycomblike chain network which is extremely movable, has very good self-cleaning properties and makes possible a simple tightening of the chain on the tire.

Connecting elements 14 in the form of double-T anchors connect in each case the facing vertical links 13 of adjacent chain strand pieces 11. The arrangement of the links and connecting elements is so selected that a netting part limited by two connecting links 14 and which comprises in each case four horizontal links has eight pivot points. The number of pivot points can be considered a measure of flexibility of the chain network, it being comparatively high in the present case, which is favorable. In order to make certain that the chain has a high resistance to wear and assures a good covering of the tread of the tire, the horizontal links 12 of the chain strand pieces are provided with crossbars 15 formed of oval round-steel links. These crossbars on the one hand increase the amount of wear of the chain and on the other hand reduce the free surface of the individual honeycombs of the chain netting. Furthermore, they reduce the pressure per unit of air between the vertical links and the tire.

For the closing of the chain netting there are used special chain locks 16 which take over at the ends of the chain the task of the connecting elements 14 without forming a gap.

Into the vertical links 13 arranged on the sides of the chain network there also extend connecting elements 14 which connect said vertical links with vertical links 17 of the side chains 18 indicated by dot-dash lines. Such a connection i.e., a connection from vertical link to vertical link, between the chain netting and the side chains, has become possible only as a result of the discovery of the profiled crossbars in accordance with the invention.

Figure 2:
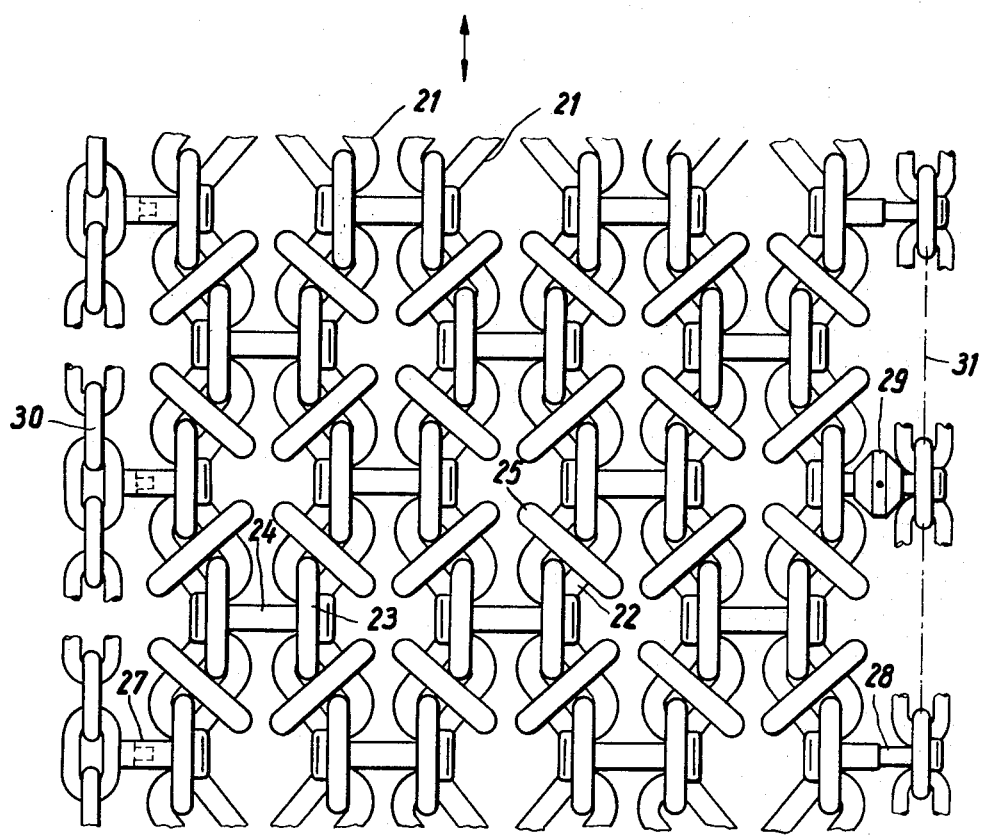
FIG. 2 is a top view of a part of an embodiment with chain strand pieces arranged in the direction of travel.

FIG. 2 shows the spread out part of a second antiskid chain in accordance with the invention which differs from the embodiment first described essentially only by the fact that in its case chain strand pieces 21 arranged in direction of travel are used. These chain strand pieces 21 consist of horizontal links 22 and vertical links 23. The successive vertical links 23 are connected via connecting pieces 24 alternately with the one and the other adjacent chain strand. In this case also an approximately hexagonal honeycomb shape results.

Crossbars 25 formed of oval chain links which are placed on the horizontal links increase the resistance to turning of the chain strands 21 and furthermore contribute to increasing the life and the protective action of the chain. The chain network can be closed at the ends by chain locks of known construction, not shown in the drawing.

For the connecting of the tread part of the chain of the invention with side parts there are used connecting elements 27, 28, 29 which can be developed as a single piece or in multipartite fashion. These connecting elements which are connected with the side chains 30, 31 have profile sections like the parts 14 and 24.

As FIG. 2 readily shows, the closeness of the chain netting shown can be further increased by reducing the angle between the longitudinal axis of the interconnected horizontal and vertical links and having them be about 30°, for instance, instead of 40°.

Details of the construction of the connecting elements 14 which correspond to the connecting elements 24 can be noted from FIGS. 3 to 6. Each of the connecting elements consists of two profiled crossbar halves 32, 33 which are connected with each other by butt welding and have at their ends in each case two luglike projections 34, 35. The projections have supporting surfaces 36 which are adapted to the shape of the arms of the vertical links and are provided with recesses 37 in the region of the welds of the vertical links.

The cross section of the profiled crossbar 32, 33 is approximately rectangular and approximately fills up the free space of the vertical links in the chain netting. In the region of the projections 34, 35 they form together with the ends of the crossbars rounded troughs 38, 39 which permit an unimpeded movement of the horizontal links with respect to the vertical links. A perspective view of the new connecting element which is the thing which makes possible the basic concept of the chain netting of the invention is shown in FIG. 6.

What is claimed is:

1. In a tire protection and antiskid chain the combination including chain strands arranged in substantially parallel rows and formed of vertically and horizontally oriented oval round steel links, and connecting elements extending through and alternately connecting adjacent parallel vertical links of successive chain strands, said connecting elements having the shape of a double-T anchor, the cross bar of which has luglike projections at the ends thereof with supporting surfaces adapted to conform to the shape of the arms of said vertical links.

2. A tire chain as in claim 1 wherein the horizontal links of the chain strand pieces have movable crossbars.

3. A tire chain as in claim 2 wherein the crossbars are formed of oval round steel links.

4. A tire chain as in claim 2 wherein the crossbars are formed of profiled steel links.

5. A tire chain as in claim 2 wherein the diameter of the crossbars surrounding the horizontal links is greater than the diameter of the links of the chain strand pieces.

6. A tire chain as claimed in claim 1 wherein the chain strand pieces are arranged transverse to the direction of travel of a wheel upon which the chain can be mounted.

7. A tire chain as claimed in claim 1 wherein the chain strand pieces are arranged in the direction of travel of a wheel upon which the chain can be mounted.

8. A tire chain as claimed in claim 1 wherein the connecting elements are formed in each case of a square crossbar.

9. A tire chain as claimed in claim 8 wherein the supporting surfaces are provided with a recess in a region where the vertical links have welded seams, the supporting surfaces being in the region of the welded seams of the vertical links.

10. A tire chain as claimed in claim 8 wherein the luglike projections are widened towards their free ends.

11. A tire chain as claimed in claim 7 wherein each second vertical link of the outer chain strand is connected by a connecting element with the side chains or intermediate chain strands leading thereto.

12. A tire chain as claimed in claim 11 wherein the connecting element has substantially the shape of a T-shaped anchor provided with an eye.

13. A tire chain as claimed in claim 11 wherein the connecting element has essentially the shape of a T-shaped anchor provided with a hook.

14. A tire chain as claimed in claim 11 wherein the connecting element is formed of a square crossbar connected by welding with a horizontal link of the side chain which bar has luglike projections at its ends and supporting surfaces adapted to the shape of the arms of the vertical links.

15. A tire chain as claimed in claim 1 wherein the horizontal links are arranged oblique to the direction of travel of the wheel.

* * * * *